(12) United States Patent
Watanabe et al.

(10) Patent No.: US 7,295,252 B2
(45) Date of Patent: Nov. 13, 2007

(54) CONTROL APPARATUS OF AUDIO-VISUAL DISPLAY APPARATUS AND THE CONTROL METHOD

(75) Inventors: Masahiro Watanabe, Ohta-ku (JP); Tomohisa Taniguchi, Sakai (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 548 days.

(21) Appl. No.: 10/388,647

(22) Filed: Mar. 17, 2003

(65) Prior Publication Data

US 2003/0177489 A1    Sep. 18, 2003

(30) Foreign Application Priority Data

Mar. 18, 2002  (JP)  ............................. 2002-073402

(51) Int. Cl.
*H04N 7/16* (2006.01)
(52) U.S. Cl. .............. 348/734; 340/825.5; 340/825.51; 725/25; 725/29; 725/37
(58) Field of Classification Search ................ 348/734; 725/25, 29, 37; 340/825.5, 825.51; *H04N 7/16*
See application file for complete search history.

(56) References Cited

U.S. PATENT DOCUMENTS

| 5,331,450 | A | * | 7/1994 | Heep et al. ..................... 398/92 |
| 5,663,716 | A | * | 9/1997 | Miwa et al. ................... 340/2.4 |
| 5,715,020 | A | * | 2/1998 | Kuroiwa et al. ............. 348/734 |
| 5,793,361 | A | * | 8/1998 | Kahn et al. ................... 345/179 |
| 5,870,380 | A | * | 2/1999 | Diehl et al. ................... 370/212 |
| 5,977,964 | A | * | 11/1999 | Williams et al. ............. 715/721 |
| 6,107,937 | A | * | 8/2000 | Hamada ................. 340/825.69 |
| 6,256,019 | B1 | * | 7/2001 | Allport ........................ 345/169 |
| 6,426,705 | B1 | * | 7/2002 | Wischoeffer ........... 340/825.69 |
| 6,505,348 | B1 | * | 1/2003 | Knowles et al. .............. 725/49 |
| 6,507,306 | B1 | * | 1/2003 | Griesau et al. ............. 341/176 |
| 6,664,949 | B1 | * | 12/2003 | Amro et al. ................. 345/168 |
| 6,714,137 | B1 | * | 3/2004 | Maxson et al. ........ 340/825.69 |
| 6,769,129 | B1 | * | 7/2004 | Perlman ....................... 725/80 |
| 6,864,778 | B2 | * | 3/2005 | Musschebroeck et al. . 340/3.41 |
| 2002/0059588 | A1 | * | 5/2002 | Huber et al. .................. 725/35 |
| 2003/0061606 | A1 | * | 3/2003 | Hartwig et al. ............... 725/25 |
| 2005/0005288 | A1 | * | 1/2005 | Novak .......................... 725/32 |

FOREIGN PATENT DOCUMENTS

JP        2000-224503        8/2000

(Continued)

*Primary Examiner*—Brian P. Yenke
(74) *Attorney, Agent, or Firm*—Oblon, Spivak, McClelland, Maier & Neusadt, P.C.

(57) ABSTRACT

A control apparatus of an audio-visual display apparatus is provided, wherein only one remote control unit in a plurality of remote control units has a control right for controlling the audio-visual display apparatus, the control apparatus determines whether a signal is received from a remote control unit with the control right until a scrambling determination time elapses from a time when detecting that an operation command is received from a remote control unit without the control right; and deprives the remote control unit with the control right of the control right and provides the control right to other remote control unit if a signal is not received from the remote control unit with the control right within the scrambling determination time.

32 Claims, 18 Drawing Sheets

FOREIGN PATENT DOCUMENTS

| | | |
|---|---|---|
| JP | 2000-224673 | 8/2000 |
| JP | 2000-253325 | 9/2000 |
| JP | 2000-333154 | 11/2000 |
| JP | 2001-61110 | 3/2001 |
| JP | 2001-224007 | 8/2001 |
| JP | 2002-58080 | 2/2002 |
| JP | 2002-77754 | 3/2002 |
| WO | WO 98/20678 | 5/1998 |

* cited by examiner

FIG.6

| | PRESENCE OR ABSENCE OF CONTROL RIGHT | PRESENCE OR ABSENCE OF OPERATION REQUEST | SCRAMBLING DETERMINATION TIME | OPERATION ASSURING TIME | NEWEST OPERATION (OPERATION REQUEST) TIME | OPERATION ASSURING END TIME |
|---|---|---|---|---|---|---|
| REMOTE CONTROL UNIT A | 1 | 0 | 5 MINUTES | 30 MINUTES | 12/3/2001 17:35:10 | 12/3/2001 18:05:10 |
| REMOTE CONTROL UNIT B | 0 | 1 | 5 MINUTES | 10 MINUTES | 12/3/2001 17:38:10 | ... |
| REMOTE CONTROL UNIT C | 0 | 0 | 5 MINUTES | 30 MINUTES | 12/3/2001 17:36:10 | ... |

ASSURE OPERATION WITHIN 30 MINUTES

FIG.7

| | PRESENCE OR ABSENCE OF CONTROL RIGHT | PRESENCE OR ABSENCE OF OPERATION REQUEST | SCRAMBLING DETERMINATION TIME | OPERATION ASSURING TIME | NEWEST OPERATION (OPERATION REQUEST) TIME | OPERATION ASSURING END TIME |
|---|---|---|---|---|---|---|
| REMOTE CONTROL UNIT A | 1 | 0 | 5 MINUTES | 30 MINUTES | 12/3/2001 17:40:10 | 12/3/2001 18:10:10 |
| REMOTE CONTROL UNIT B | 0 | 0 | 5 MINUTES | 10 MINUTES | 12/3/2001 17:38:10 | ... |
| REMOTE CONTROL UNIT C | 0 | 0 | 5 MINUTES | 30 MINUTES | 12/3/2001 17:36:10 | ... |

FIG.8

| | PRESENCE OR ABSENCE OF CONTROL RIGHT | PRESENCE OR ABSENCE OF OPERATION REQUEST | SCRAMBLING DETERMINATION TIME | OPERATION ASSURING TIME | NEWEST OPERATION (OPERATION REQUEST) TIME | OPERATION ASSURING END TIME |
|---|---|---|---|---|---|---|
| REMOTE CONTROL UNIT A | 1 | 0 | 5 MINUTES | 30 MINUTES | 12/3/2001 17:40:10 | 12/3/2001 18:10:10 |
| REMOTE CONTROL UNIT B | 0 | 1 | 5 MINUTES | 10 MINUTES | 12/3/2001 17:42:10 | ... |
| REMOTE CONTROL UNIT C | 0 | 0 | 5 MINUTES | 30 MINUTES | 12/3/2001 17:36:10 | ... |

FIG.9

| | PRESENCE OR ABSENCE OF CONTROL RIGHT | PRESENCE OR ABSENCE OF OPERATION REQUEST | SCRAMBLING DETERMINATION TIME | OPERATION ASSURING TIME | NEWEST OPERATION (OPERATION REQUEST) TIME | OPERATION ASSURING END TIME |
|---|---|---|---|---|---|---|
| REMOTE CONTROL UNIT A | 1 | 0 | 5 MINUTES | 30 MINUTES | 12/3/2001 17:40:10 | 12/3/2001 18:10:10 |
| REMOTE CONTROL UNIT B | 0 | 1 | 5 MINUTES | 10 MINUTES | 12/3/2001 18:15:10 | ... |
| REMOTE CONTROL UNIT C | 0 | 0 | 5 MINUTES | 30 MINUTES | 12/3/2001 17:36:10 | ... |

FIG.10

| | PRESENCE OR ABSENCE OF CONTROL RIGHT | PRESENCE OR ABSENCE OF OPERATION REQUEST | SCRAMBLING DETERMINATION TIME | OPERATION ASSURING TIME | NEWEST OPERATION (OPERATION REQUEST) TIME | OPERATION ASSURING END TIME |
|---|---|---|---|---|---|---|
| REMOTE CONTROL UNIT A | 1 | 0 | 5 MINUTES | 30 MINUTES | 12/3/2001 17:40:10 | 12/3/2001 18:10:10 |
| REMOTE CONTROL UNIT B | 0 | 1 | 5 MINUTES | 10 MINUTES | 12/3/2001 18:15:10 | ... |
| REMOTE CONTROL UNIT C | 0 | 1 | 5 MINUTES | 30 MINUTES | 12/3/2001 18:14:10 | ... |

FIG.11A

| REMOTE CONTROL UNIT | CONTROL RIGHT OBTAINING ORDER |
|---|---|
| REMOTE CONTROL UNIT A | 1 |
| REMOTE CONTROL UNIT B | 2 |
| REMOTE CONTROL UNIT C | 3 |

FIG.11B

| REMOTE CONTROL UNIT | CONTROL RIGHT OBTAINING ORDER |
|---|---|
| REMOTE CONTROL UNIT A | 3 |
| REMOTE CONTROL UNIT B | 1 |
| REMOTE CONTROL UNIT C | 2 |

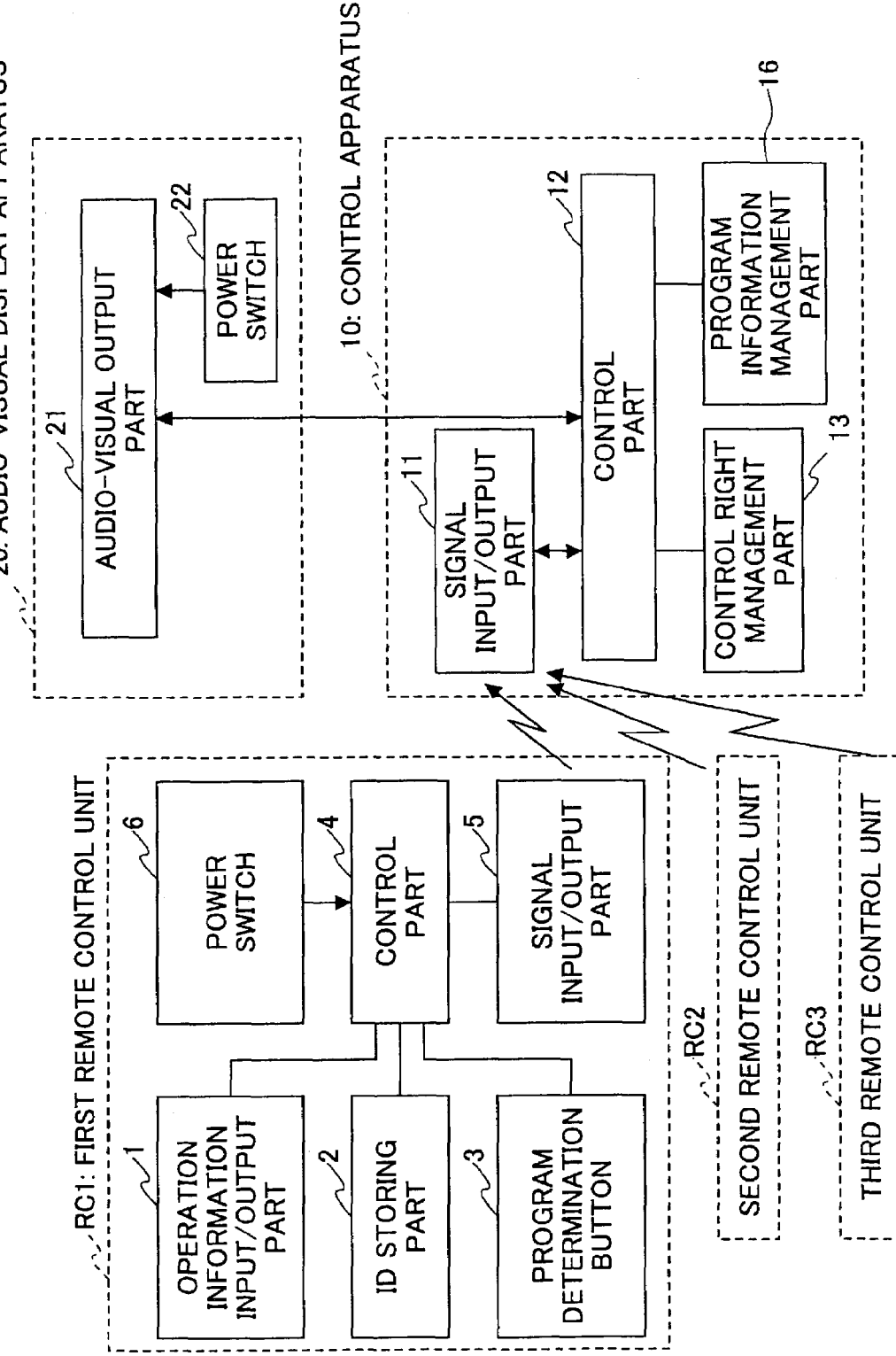

FIG.14

| TIME \ CHANNEL | 1 | 4 | 8 | 10 | 12 |
|---|---|---|---|---|---|
| 10 O' CLOCK | PROGRAM A | PROGRAM B | PROGRAM C | PROGRAM D | PROGRAM E |
| | | PROGRAM M | PROGRAM H | | |
| 11 O' CLOCK | PROGRAM F | PROGRAM G | | PROGRAM J | PROGRAM L |
| | | | PROGRAM I | PROGRAM K | |

FIG.16

| TIME \ CHANNEL | 1 | 4 | 8 | 10 | 12 |
|---|---|---|---|---|---|
| 22 O' CLOCK | PROGRAM | PROGRAM | PROGRAM | PROGRAM | PROGRAM |
| | PROGRAM | PROGRAM | | | PROGRAM |
| 23 O' CLOCK | PROGRAM | PROGRAM | PROGRAM | PROGRAM | PROGRAM |

CONTROL APPARATUS OF AUDIO-VISUAL DISPLAY APPARATUS AND THE CONTROL METHOD

BACKGROUND OF THE INVENTION

1. Field of the Invention

The present invention relates to a control apparatus for an audio-visual display apparatus, in which a plurality of remote control units are associated with one audio-visual display apparatus, and only one remote control unit in the plurality of remote control units can control the audio-visual display apparatus.

2. Description of the Related Art

A conventional remote control unit of a television receiver controls the television receiver from a position apart from the television receiver. Other than the conventional television remote control unit, a remote control unit with a cellular phone function, a remote control unit with a PDA function, and a remote control unit with a watch function are known.

PDA (Personal Digital Assistant, portable personal information terminal) is an electronic device that fits comfortably in the palm of a hand and that has some of capabilities of a personal computer.

A broadcasting system in which the television receiver is used includes a radio wave broadcasting system, an Internet broadcasting system and the like. The radio wave broadcasting system is a system for broadcasting programs via radio waves such as general terrestrial TV broadcasting system, radio broadcasting system, satellite broadcasting system, digital satellite broadcasting system and the like. The Internet broadcasting system is a system for broadcasting programs via the Internet.

Generally, the audio-visual display apparatus such as a television receiver and a video recording/reproducing apparatus is equipped with one remote control unit specific for the audio-visual display apparatus. By operating the specific remote control unit, the audio-visual display apparatus can be controlled from a place apart from the audio-visual display apparatus by using a wireless signal such as an infrared signal and a radio signal and the like.

For operating an audio-visual display apparatus such as the television receiver and the video recording/reproducing apparatus, a user generally use the remote control unit. Even when a plurality of users view a television receiver, one user having the remote control unit operates the audio-visual display apparatus for changing a channel, a volume and the like. If a user who does not have the remote control unit wants to change the channel, the user needs to borrow the remote control unit from a user having the remote control unit. It is troublesome to borrow and lend the remote control unit each time someone wants to operate the television receiver.

To solve this drawback, a plurality of remote control units may be provided so that any remote control unit can control the audio-visual display apparatus. However, in this case, a scramble for channels may occur and this may become another drawback.

To solve this drawback, Japanese laid-open patent application No.2001-61110 discloses a method for providing remote control units with priority orders to improve operability of the television receiver, and discloses a method for deciding operation from sum of the priority degrees provided to a plurality of remote control units.

The above-mentioned priority order is determined according to priority data provided to the remote control units. The priority data is similar to points, so that the higher the value (points) is, the higher the priority order is. The number of times for requesting a channel is accumulated while assigning priority degree as a weight for each channel, and a channel having the highest number of requested times is displayed.

Japanese laid-open patent application No.2000-224503 discloses a method for distinguishing viewer information according to viewer ID so that an apparatus can be associated with a plurality of viewers. In addition, Japanese laid-open patent application No.2000-253325 discloses a method for presenting recommended programs by extracting preference information of users by obtaining viewing history and comparing the history with EPG (electronic program guide).

However, according to the above-mentioned conventional examples, when a user of a remote control unit having a control right does not exist near the audio-visual display apparatus, there is a problem in that even when a user of a remote control unit that does not have the control right wants to acquire the control right, the user can not obtain the right.

SUMMARY OF THE INVENTION

An object of the present invention is to provide a control method for an audio-visual display apparatus and remote control units in which, even when a user of a remote control unit having the control right does not exist near the audio-visual display apparatus, a user of a remote control unit without control right can acquire the control right if the user wants the control right.

The object can be achieved by a control apparatus of an audio-visual display apparatus, wherein a plurality of remote control units are associated with the audio-visual display apparatus, only one remote control unit in the plurality of remote control units has a control right for controlling the audio-visual display apparatus, and other remote control units do not have the control right, the control apparatus including:

a receiving part for receiving an operation command and a remote control unit ID sent from a remote control unit;

a determining part for determining whether a signal is received from a remote control unit with the control right until a first predetermined time elapses from a time when detecting that an operation command is received from a remote control unit without the control right;

a control right depriving and providing part for depriving the remote control unit with the control right of the control right and providing the control right to other remote control unit if a signal is not received from the remote control unit with the control right within the first predetermined time.

According to the above-mentioned invention, a first predetermined time, that can be called a scrambling determination time, is provided. Until the first predetermined time elapses, if a signal is not received from the remote control unit with the control right, a remote control unit without the control right can obtain the control right. Thus, even when a user of a remote control unit having the control right does not exist near the audio-visual display apparatus, a user of a remote control unit without control right can acquire the control right if the user wants the control right.

In the control apparatus, the control right depriving and providing part may reject an operation command from the remote control unit without the control right if the remote control unit without the control right sends the operation command before a second predetermined time elapses from a time when the remote control unit with the control right sends an operation command; and start measurement of the first predetermined time if the remote control unit without the control right sends the operation command after the second predetermined time elapses.

In addition, the control apparatus may include an end time detection part for detecting an end time of a program specified by the operation command; wherein, when the remote control unit with the control right sends an operation command specifying a program, the control right depriving and providing part deprives the remote control unit with the control right of the control right at the end time of the program.

Accordingly, it can be prevented that the control right does not move to other remote control unit as long as the remote control unit with the control right continues to request operations.

The control apparatus may include a storing part for storing a program specifying time indicating a time when a program is specified; wherein the control right depriving and providing part deprives the remote control unit with the control right of the control right at an end time of a next program instead of an end time of the specified program if a time from the program specifying time to the end time of the specified program is shorter than a third predetermined time.

Accordingly, even when the time to the end of a specified program is short, the control right can be kept until the end of a next program.

The above-mentioned parts included in the computer apparatus may be also realized by a computer program.

BRIEF DESCRIPTION OF THE DRAWINGS

Other objects, features and advantages of the present invention will become more apparent from the following detailed description when read in conjunction with the accompanying drawings, in which:

FIGS. 6-10 show contents of a database in the control right management part 13 when the remote control unit A has the control right according to the first embodiment of the present invention;

FIG. 11 shows status of order for obtaining the control right before and after the operation shown in the flowchart of FIG. 5;

FIG. 12 shows a block diagram of a broadcasting system BS1 according to the second embodiment of the present invention;

FIG. 14 shows an example of the electronic program table stored in the program information management part 16 beforehand according to the second embodiment;

FIG. 16 shows an example of the provisional program table stored in the program information management part 16 beforehand according to the second embodiment;

DETAILED DESCRIPTION OF THE PREFERRED EMBODIMENTS

In the following, embodiments of the present invention will be described.

First Embodiment

Figure 1:
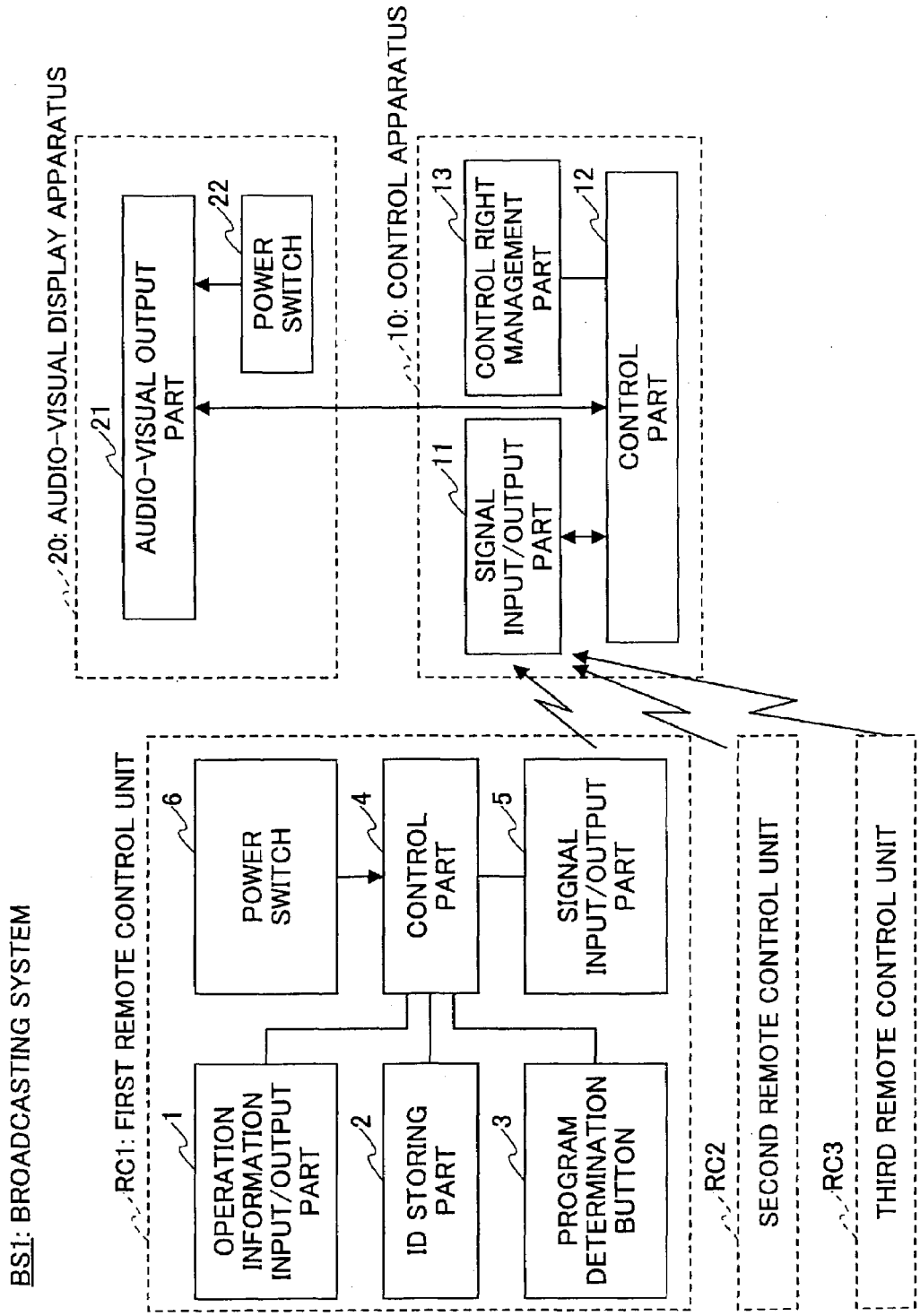
FIG. 1 shows a block diagram of a broadcasting system BS1 of the first embodiment of the present invention.

FIG. 1 shows a block diagram of a broadcasting system BS1 of the first embodiment of the present invention.

The broadcasting system BS1 includes a first remote control unit RC1, a second remote control unit RC2, a third remote control unit RC3, an audio-visual display apparatus 20, and a control apparatus 10 for controlling the audio-visual display apparatus 20.

The remote control units RC1, RC2 and RC3 can control the audio-visual display apparatus 20 via the control apparatus 10. At some point of time, only one of the remote control units RC1, RC2 and RC3 can control the audio-visual display apparatus 20. Operation of the audio-visual display apparatus 20 includes selection of a program, control of the volume, on/off control of the power of the audio-visual display apparatus 20 and the like.

Each of the remote control units RC1, RC2 and RC3 is provided with a specific remote control unit ID. When a user operates the remote control unit for requesting an operation for the audio-visual display apparatus 20, the ID is sent to the control apparatus 10.

The first remote control unit RC1 includes an operation information input/output part 1, an ID storing part 2, a program determination button 3, a control part 4, a signal input/output part 5, and a power switch 6.

The operation information input/output part 1 is for inputting, via an operation panel and the like, an operation command such as information for selecting a program to be displayed on the audio-visual display apparatus 20.

The ID storing part 2 stores the ID of the first remote control unit RC1. The program determination button 3 is used for indicating user's intention to determine a program displayed on the audio-visual display apparatus 20. The control part 4 controls the whole of the first remote control unit RC1. The power switch 6 is used for turning on/off for the audio-visual display apparatus 20. The configuration of each of the second remote control unit RC2 and the third remote control unit RC3 is the same as that of the first remote control unit RC1. Each unit stores its specific ID.

The audio-visual display apparatus 20 includes an audio-visual output part 21 and a power switch 22. The control apparatus 10 of the audio-visual display apparatus includes a signal input/output part 11, a control part 12 and a control right management part 13.

The signal input/output part 11 is used for inputting a signal from the remote control units RC1-RC3. For example, the signal input/output part 11 receives a program specifying command and an ID of the remote control unit. The program specifying command is used for specifying a desired program among programs on the air. Bi-directional wireless communication may be performed between one of the remote control units RC1-RC3 and the control apparatus 10.

The signal input/output part 11 may receive an operation command and an ID transmitted from a remote control unit. In addition, the signal input/output part 11 includes a remote control unit ID detection part for detecting an ID from a received signal and an operation command transmission detection part for detecting that the operation command is being transmitted from the received signal.

The control part 12 controls the whole parts of the control apparatus 10 and measures time from a time when detecting that a remote control unit without the control right transmits an operation command while a remote control unit with the control right does not transmit an operation command.

The control right management part 13 manages control rights for the remote control units RC1-RC3 for determining which remote control unit has the control right. In addition, the control right management part 13 has a function for depriving the remote control unit with the control right of the control right when the remote control unit with the control right does not send any signal after a predetermined scrambling determination time passed, and providing the control right to the remote control unit without control right which transmits the operation command.

In addition, the control right management part 13 has a function for rejecting an operation command from the remote control unit without the control right if the remote control unit without the control right sends the operation command before a predetermine operation assuring time elapses from a time when the remote control unit with the control right sends an operation command, and starting measurement of the scrambling determination time if the remote control unit without the control right sends the operation command after the operation assuring time elapses.

The control apparatus 10 of the audio-visual display apparatus 20 has a function for displaying operation information requested by the remote control unit without the control right on the audio-visual display apparatus 20 when it detects that the remote control unit without the control right transmits an operation command.

Next, operation of this embodiment will be described.

Figure 2:
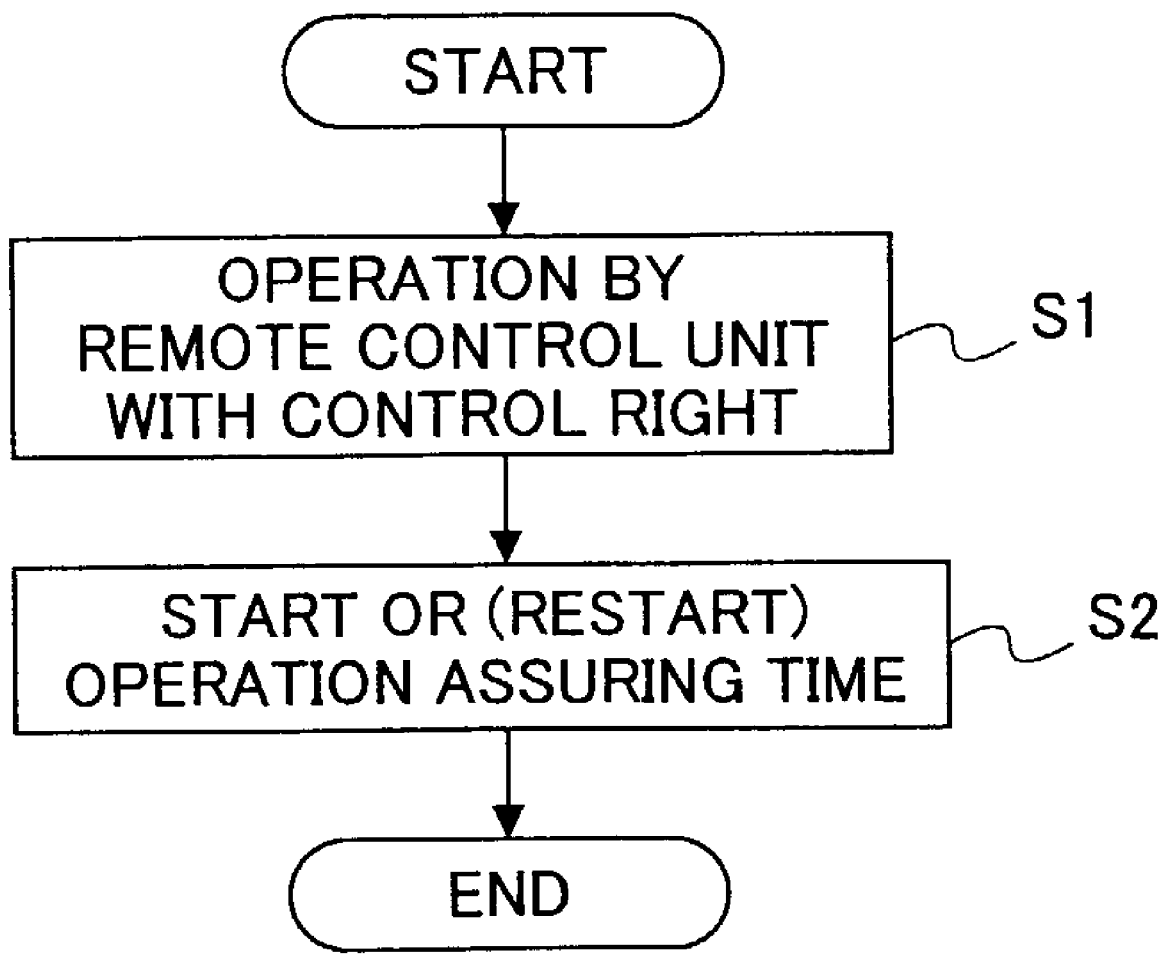
FIG. 2 shows a flowchart showing an operation of the system of the first embodiment when a remote control unit with control right requests operation of the audio-visual display apparatus 20.

FIG. 2 shows a flowchart showing an operation performed by the control apparatus 10 when a remote control unit with control right requests operation of the audio-visual display apparatus 20, that is, when the remote control unit is operated by a user and sends a command signal to the control apparatus 10.

When the remote control unit with the control right requests operation of the audio-visual display apparatus 20 in step S1, it is assured that the remote control unit with the control right can operate the audio-visual display apparatus 20 for a predetermined time (that is the operation assuring time) from the time of the request of the operation in step S2. Regardless whether the operation assuring time has been measured or has not been measured, measurement of the operation assuring time starts when the remote control unit with the control right operates the audio-visual display apparatus 20. The operation assuring time is provided for removing a threat that the control right is deprived of by other remote control unit. The operation assuring time is different from a merely effective time of the control right.

Figure 3:
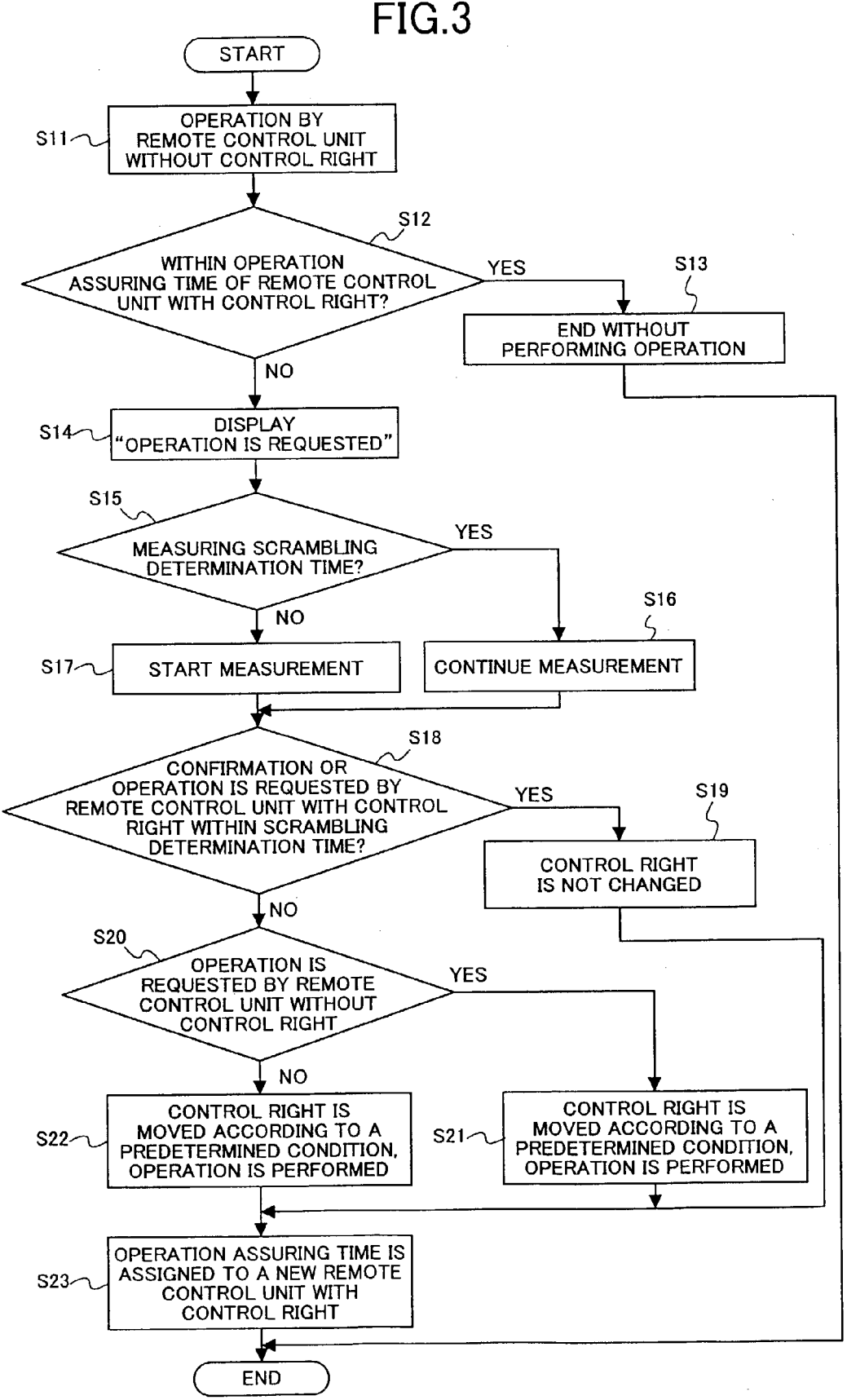
FIG. 3 shows a flowchart showing operations of the system of the first embodiment of the present invention.

FIG. 3 shows a flowchart showing operations performed mainly by the control apparatus 10 of the first embodiment of the present invention.

First, a remote control unit without the control right requests an operation of the audio-visual display apparatus 20 in step S11. If the time when the remote control unit without the control right requests the operation is within the operation assuring time for a remote control unit with the control right (for example, thirty minutes) in step S12, the operation is not performed, and the process ends in step S13.

If the time when the remote control unit without the control right requests the operation is not within the operation assuring time (steps S11, S12), the operation is not performed, but, the audio-visual output part 21 displays "operation is requested" in step S14. Then, the scrambling determination time (for example, five minutes) is measured. If the scrambling determination time is being measured in step S15, the measurement continues in step S16.

If the scrambling determination time is not being measured in step S15, the measurement is started in step S17.

If there is an operation or a confirmation operation by the remote control unit with the control right within the scrambling determination time in step S18, the operation is performed or the confirmation operation is performed, and the control right still remains in the remote control unit in step S19.

If there is not an operation or a confirmation operation by the remote control unit with the control right and an operation is requested from a remote control unit without the control right within the scrambling determination time in steps S18 and S20, the control right is moved to a remote control unit according to a predetermined condition, and an operation is performed in step S21.

If there is not an operation or a confirmation operation by the remote control unit with the control right and an operation is not requested from a remote control unit without the control right within the scrambling determination time in steps S18 and S20, the control right is moved to a remote control unit without the control right. When the remote control unit operates the audio-visual display apparatus in step S22, measurement of the operation assuring time starts for the remote control unit (that was the remote control unit without control right originally) in step S23.

The above-mentioned steps S20-S21 and S20-S22 indicate that the control right moves to the remote control unit without the control right if the remote control unit with the control right does not transmit any request within the scrambling determination time.

Figure 4:
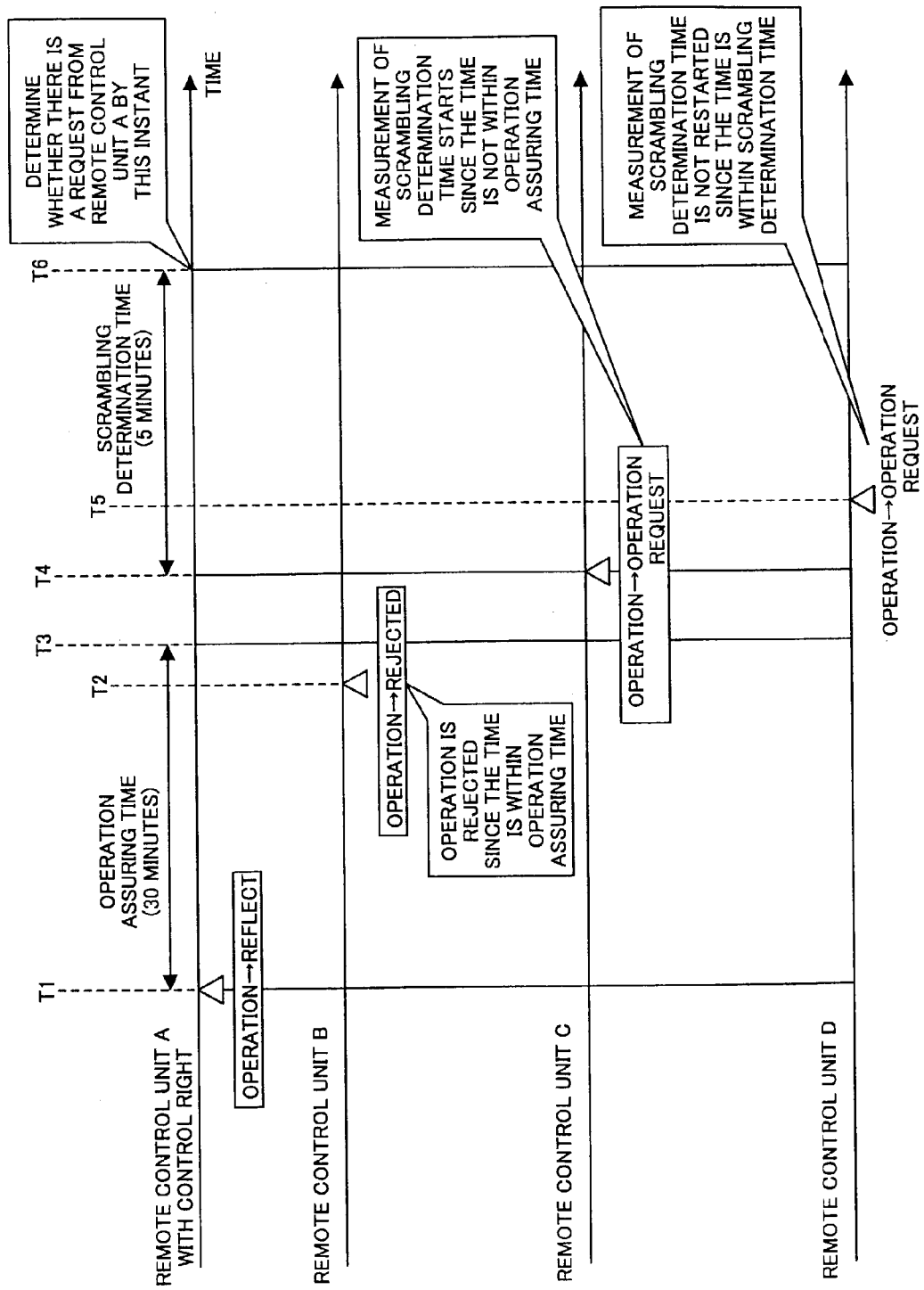
FIG. 4 shows a timing chart for explaining operations on the operation assuring time and the scrambling determination time according to the first embodiment.

FIG. 4 shows a timing chart for explaining operations on the operation assuring time and the scrambling determination time.

In FIG. 4, it is assumed that the remote control unit A has the control right and the remote control units B, C and D do not have the control right. In a time T1, when the remote control unit A requests an operation, the operation is reflected to the audio-visual display apparatus 20. From the time when the remote control unit A requests the operation, measurement of the operation assuring time (thirty minutes, for example) is started. The operation assuring time is a time in which operation by the remote control unit A is assured even though any other remote control unit request an operation.

At a time T2 which is within the operation assuring time, when the remote control unit B that does not have the control right requests an operation, the operation is rejected since the time is within the operation assuring time, and the operation is not performed. At a time T3, the operation assuring time elapses.

At a time T4 after the operation assuring time elapsed, the remote control unit C requests an operation. Since the time of the request is not within the operation assuring time, the request is admitted and measurement of the scrambling determination time (five minutes for example) is started. If a remote control unit D requests an operation within the scrambling determination time, measurement of the scrambling determination time is not restarted.

It is checked whether the remote control unit A requests any operation by a time T6 when the scrambling determination time ends. If the remote control unit A requests an operation within the scrambling determination time, the operation assuring time is assigned again to the remote control unit A.

Figure 5:
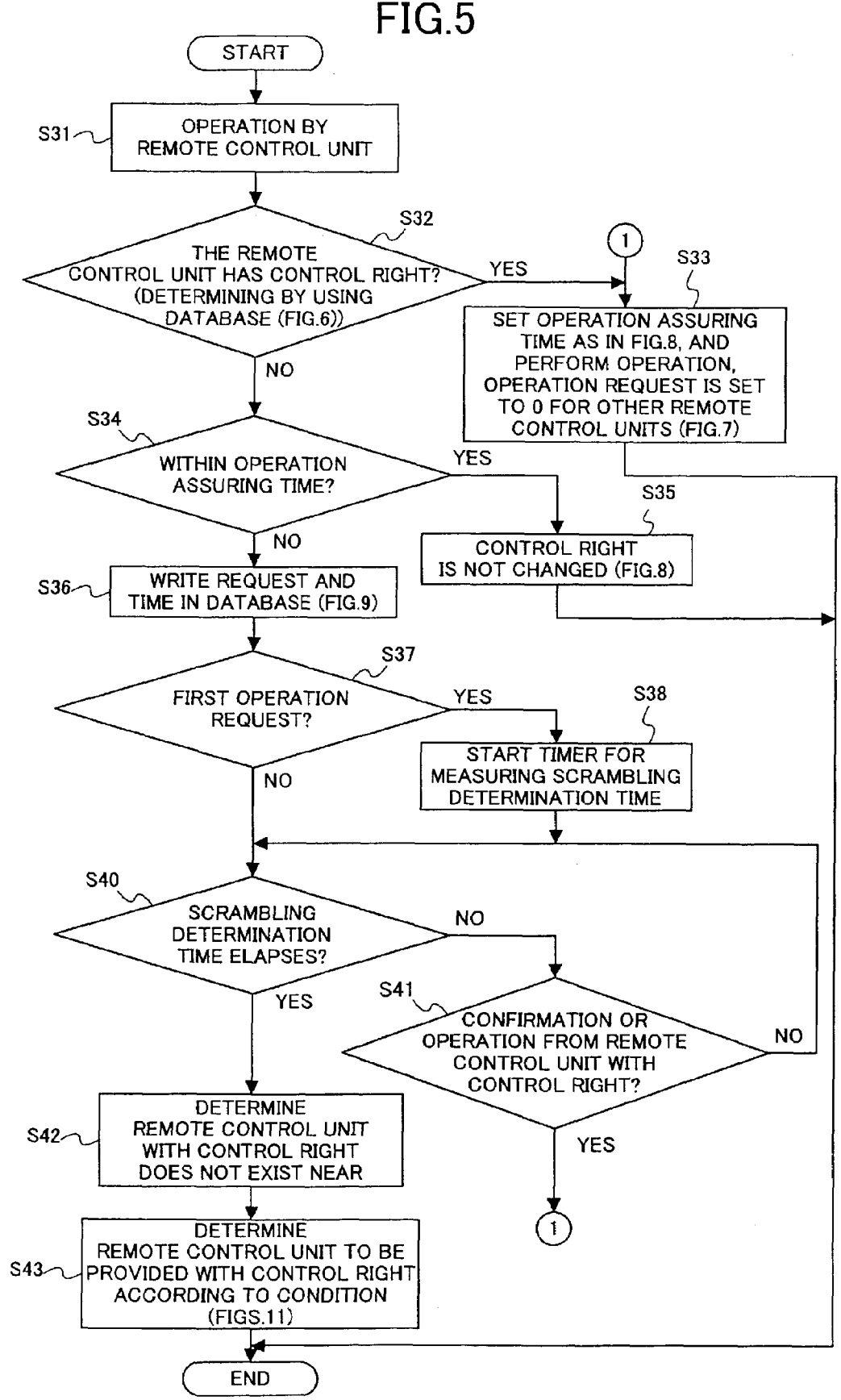
FIG. 5 is a flowchart showing a detection method in scrambling in the first embodiment of the present invention.

Next, a scrambling detection method will be described. FIG. 5 is a flowchart showing a first detection method of scrambling in the above-mentioned embodiment.

FIGS. 6-10 show contents of a database in the control right management part 13 when the remote control unit A has the control right.

A remote control unit requests an operation such as channel change and the like in step S31. When the control apparatus determines that the remote control unit has a control right by referring to the control management part 13 shown in FIG. 6 in step S32, the operation assuring time is set as a value shown in FIG. 6 (thirty minutes). At the same time, the requested operation is performed. In addition, presence of operation request by other remote control units is set to 0 in step S33 as shown in FIG. 7. Then, the process ends.

If the remote control unit does not have the control right in step S32, when the time is within the operation assuring time of the remote control unit A in step S34, the control right does not move as shown in FIG. 8 in step S35, and the process ends.

If the time is not within the operation assuring time of the remote control unit A in step S34, the operation request and the time are written into the database as shown in FIG. 9 in step S36. If the request is the first operation request after the operation assuring time elapsed in step S37, a timer for measuring scrambling determination time is started in step S38.

If the request is not the first operation request in step S37, newest operation time is updated as shown in FIG. 10. If the scrambling determination time is not elapsed in step S40, in addition, if the remote control unit A requests confirmation or operation in step S41, the process returns to the step S33. If the remote control unit A does not request confirmation or operation in step S41, the process returns to step S40.

If the scrambling determination time elapses in step S40, it is determined that the remote control unit A does not exist in the vicinity of the audio-visual display apparatus (a user that uses the remote control unit A does not exist in the vicinity), then, a remote control unit to which the control right is to be assigned is determined according to the condition shown in FIG. 11 in step S43.

FIG. 11 shows status of order of obtaining the control right before and after the operation shown in the flowchart of FIG. 5.

Before the detection of the scrambling, as shown in FIG. 11A, the control right is given to the remote control unit A. That is, control right getting order for the remote control unit A is the first, and orders for the remote control units B and C are second and third respectively. When the remote control unit B requests an operation and the remote control unit A does not request a operation within the scrambling determination time, the control right is deprived of from the remote control unit A. As shown in FIG. 11B, the order of the remote control unit A becomes third, and the remote control unit B gets the control right, that is, the order for the remote control unit B becomes first. In addition, the order for the remote control unit C becomes second.

If any remote control unit does not request an operation within the scrambling determination time, the control right moves to the remote control unit B according to the order shown in FIG. 11A.

As for methods for moving the control right, there are methods other than the above-mentioned method using the tables shown in FIGS. 11A and 11B indicating priority order. As an example of the methods, at the instant when the scrambling determination time elapsed, the control right can be moved to a remote control unit that requested an operation at a time nearest to the time when the scrambling determination time elapsed. In addition, as an example of the methods, the control right can be given to a remote control unit that causes scrambling. In addition, as an example of the methods, the control right can be given to a remote control unit for which the number of times of operation requests within the scrambling determination time is largest. Further, a method can be considered in which the control right is given to a remote control unit that does not have the control right for the longest time. Other methods can be considered.

For example, the control right is deprived of at the instant that the scrambling determination time elapses, and after that, the control right is given to a remote control unit that requests an operation first.

The control apparatus can be realized by executing a program on a computer. The program causes a computer to execute a receiving process for receiving an operation command and a remote control unit ID sent from a remote control unit; a determining process for determining whether a signal is received from a remote control unit with the control right from a time when detecting that an operation command is received from a remote control unit without the control right to a time when the scrambling determination time elapses; a control right depriving and providing process for depriving the remote control unit with the control right of the control right and providing the control right to other remote control unit if a signal is not received from the remote control unit with the control right within the scrambling determination time.

The program can be stored in a recording medium such as a FD (flexible disk), a CD (compact disk), a HD (hard disk), a DVD (digital versatile disk), a semiconductor memory and the like.

According to the first embodiment, even when a user of a remote control unit having the control right does not exist near the audio-visual display apparatus, a user of a remote control unit without control right can acquire the control right if the user wants the control right.

Second Embodiment

In the following, the second embodiment of the present invention will be described. In the second embodiment, a control right end time is provided for a control right. By applying the second embodiment to the first embodiment, it can be avoided that a control right does not move to other remote control unit as long as the remote control unit with control right continues to request an operation.

First Example

FIG. 12 shows a block diagram of a broadcasting system BS1 according to the second embodiment of the present invention. The broadcasting system BS1 of the second embodiment is different from that of the first embodiment in that the control apparatus 10 includes a program information management part 16 for storing and managing electronic program table or a provisional program table.

In this example, the control part 12 controls the whole of the control apparatus 10 and detects end time of a program specified by a program specifying command. The end time is detected on the basis of the electronic program table or the provisional program table stored in the program information management part 16. The control part 12 has a function for assigning a control right to a remote control unit corresponding to a remote control ID that is received by the control apparatus 10 until the detected end time of the specified program elapses.

The control right management part 13 manages the remote control units RC1-RC3 and determines which unit has the control right. In addition, the control right management part 13 deprives a remote control unit having the control right of the control right at the program end time.

The provisional program table is a program table including programs in which time length of each program is provisionally determined according to a time period. For example, in a normal time period, it is assumed that a program starts on 0 minutes or 30 minutes in each hour and ends 30 minutes after. For a time period of 19-23 o'clock, since one hour program is generally broadcasted, the time length of a program is set to be one hour. In other time periods, the time length is 30 minutes or one hour according to a channel. The 30 minutes program and one hour program can be mixed according to a channel in the same time period.

Next, the operation of the system will be described according to the first example of the second embodiment.

Figure 13:
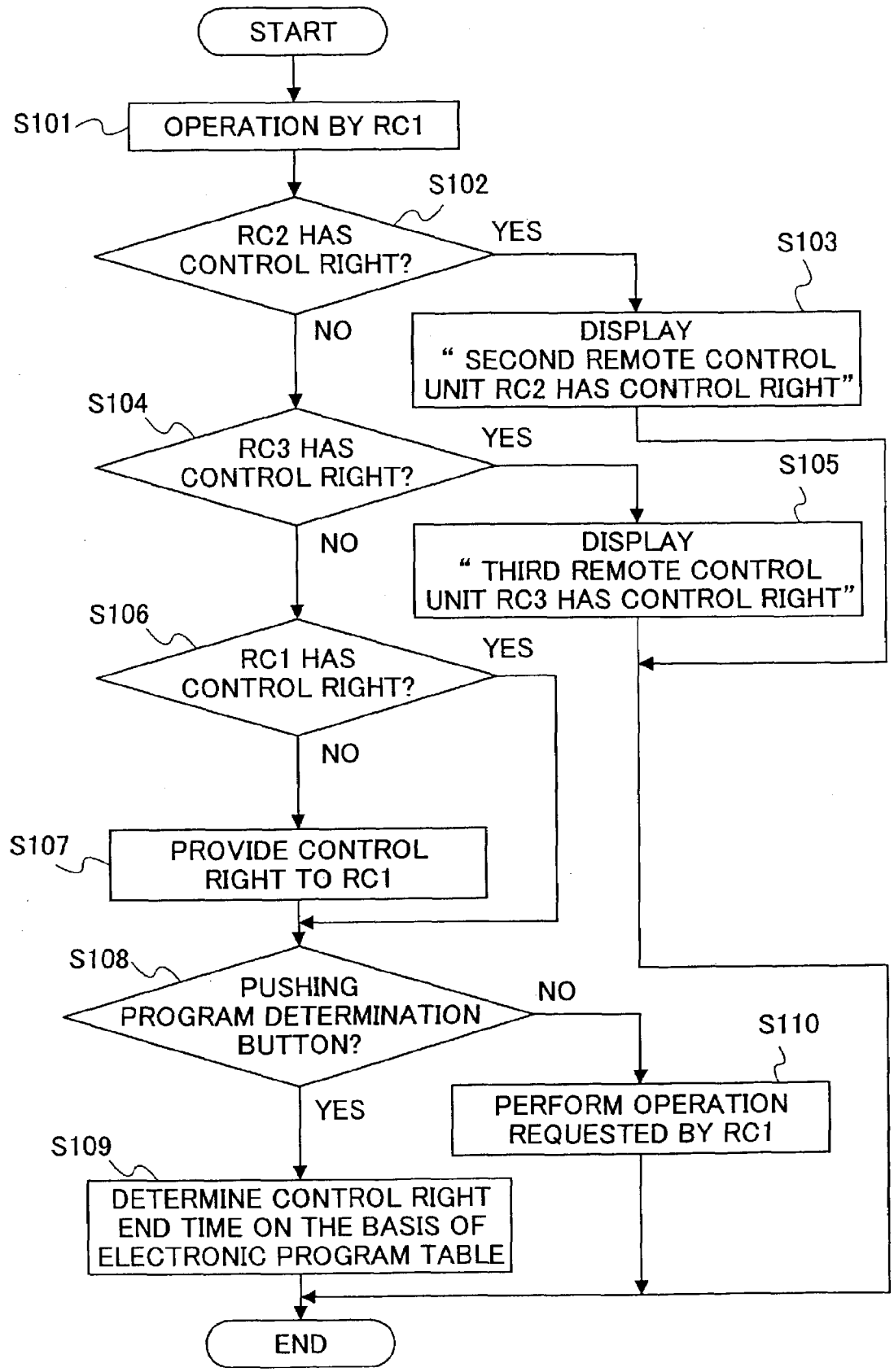
FIG. 13 shows a flowchart showing the operation of the first example of the second embodiment of the present invention.

FIG. 13 shows a flowchart showing the operation of the first example of the second embodiment of the present invention.

FIG. 14 shows an example of the electronic program table stored in the program information management part 16 beforehand.

First, a first remote control unit RC1 requests an operation such as program selection for the audio-visual display apparatus 20 in step S101.

Then, the control apparatus determines whether the second remote control unit RC2 has the control right by using a database of the control right management part 13 in step S102. If the second remote control unit RC2 has the control right, the audio-visual output part 21 displays "the second remote control unit RC2 has a control right" in step S103.

When the second remote control unit RC2 does not have the control right in step S102, it is determined whether the third remote control unit RC3 has the control right by using the database of the control right management part 13 in step S104. If the third remote control unit has the control right, the audio-visual output part 21 displays "the third remote control unit RC3 has a control right" in step S105.

When the third remote control unit RC3 does not have the control right in step S104, it is determined whether the first remote control unit RC1 has the control right by using the database of the control right management part 13 in step S106. If the first remote control unit RC1 does not have the control right, the control right is given to the first remote control unit RC1 in step S107.

If the operation for requesting the operation of the audio-visual display apparatus 20 is pushing the program determination button 3 in step S108, control right end time is determined according to the electronic program table in step S109. If the operation is not pushing a program determination button 3 in step S108, the operation requested by the first remote control unit RC1 is performed in step S110.

Second Example

Next, the operation of the system will be described according to the second example of the second embodiment. In the second example, the control right end time is determined on the basis of the provisional program table when the program information management part 16 does not store the electronic program table.

Figure 15:
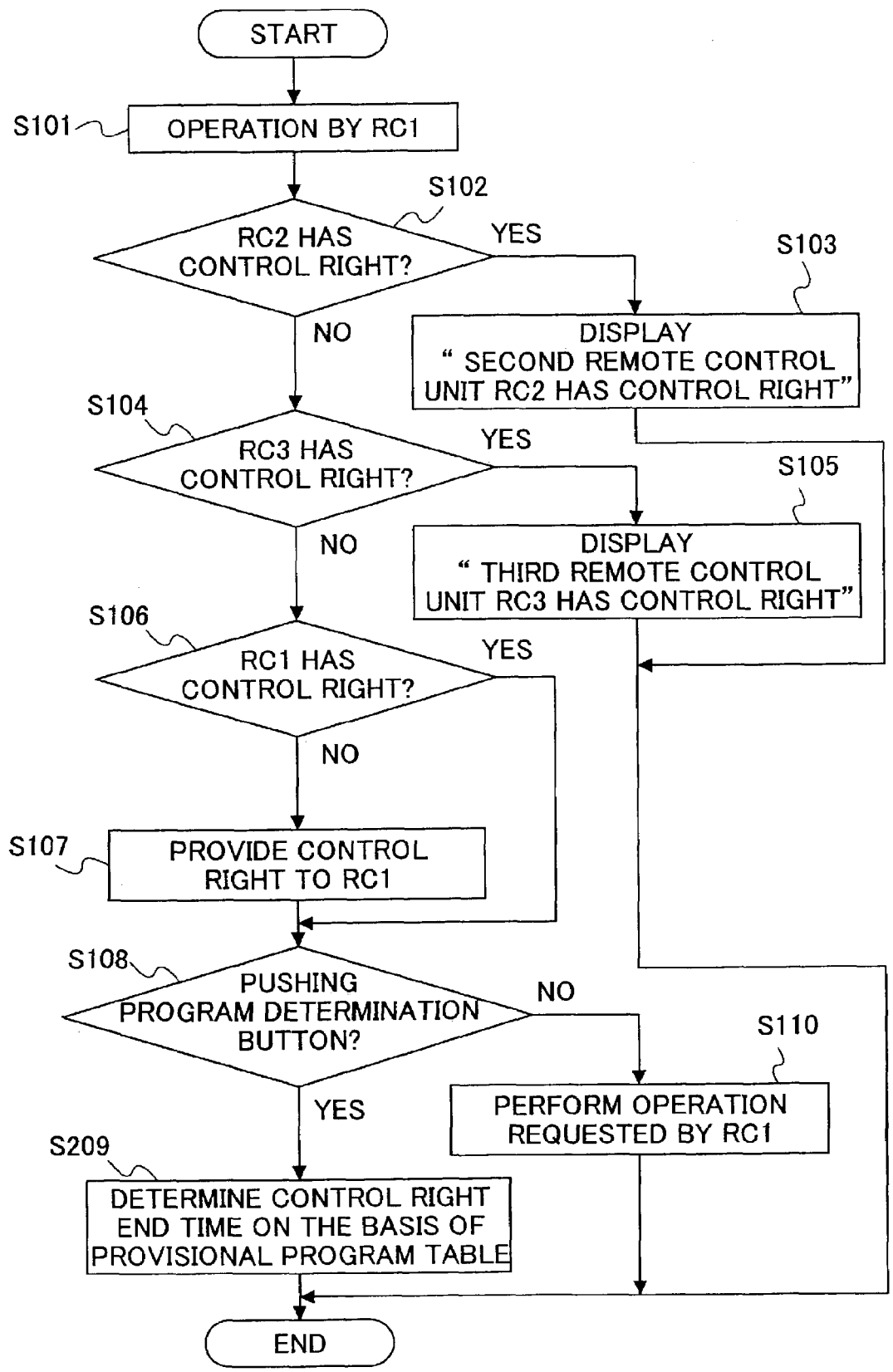
FIG. 15 shows a flowchart showing the operation of the second example of the second embodiment of the present invention.

FIG. 15 shows a flowchart showing the operation of the second example of the second embodiment of the present invention.

FIG. 16 shows an example of the provisional program table stored in the program information management part 16 beforehand.

First, a first remote control unit RC1 requests an operation such as program selection for the audio-visual display apparatus 20 in step S101.

Then, the control apparatus determines whether the second remote control unit RC2 has the control right by using a database of the control right management part 13 in step S102. If the second remote control unit RC2 has the control right, the audio-visual output part 21 displays "the second remote control unit RC2 has a control right" in step S103.

When the second remote control unit RC2 does not have the control right in step S102, it is determined whether the third remote control unit RC3 has the control right by using the database of the control right management part 13 in step S104. If the third remote control unit has the control right, the audio-visual output part 21 displays "the third remote control unit RC3 has a control right" in step S105.

When the third remote control unit RC3 does not have the control right in step S104, it is determined whether the first remote control unit RC1 has the control right by using the database of the control right management part 13 in step S106. If the first remote control unit RC1 does not have the control right, the control right is given to the first remote control unit RC1 in step S107.

If the operation for requesting the operation of the audio-visual display apparatus 20 is pushing the program determination button 3 in step S108, control right end time is determined according to the provisional program table in step S209. If the operation is not pushing a program determination button 3 in step S108, the operation requested by the first remote control unit RC1 is performed in step S110.

Third Example

In the following, third example of the second embodiment will be described.

In the third example of the second embodiment, if a time from a time when the control right is acquired to a time when a program being broadcasted at the time ends is shorter than a predetermined grace period, the control right is kept until the next program ends.

Figure 17:
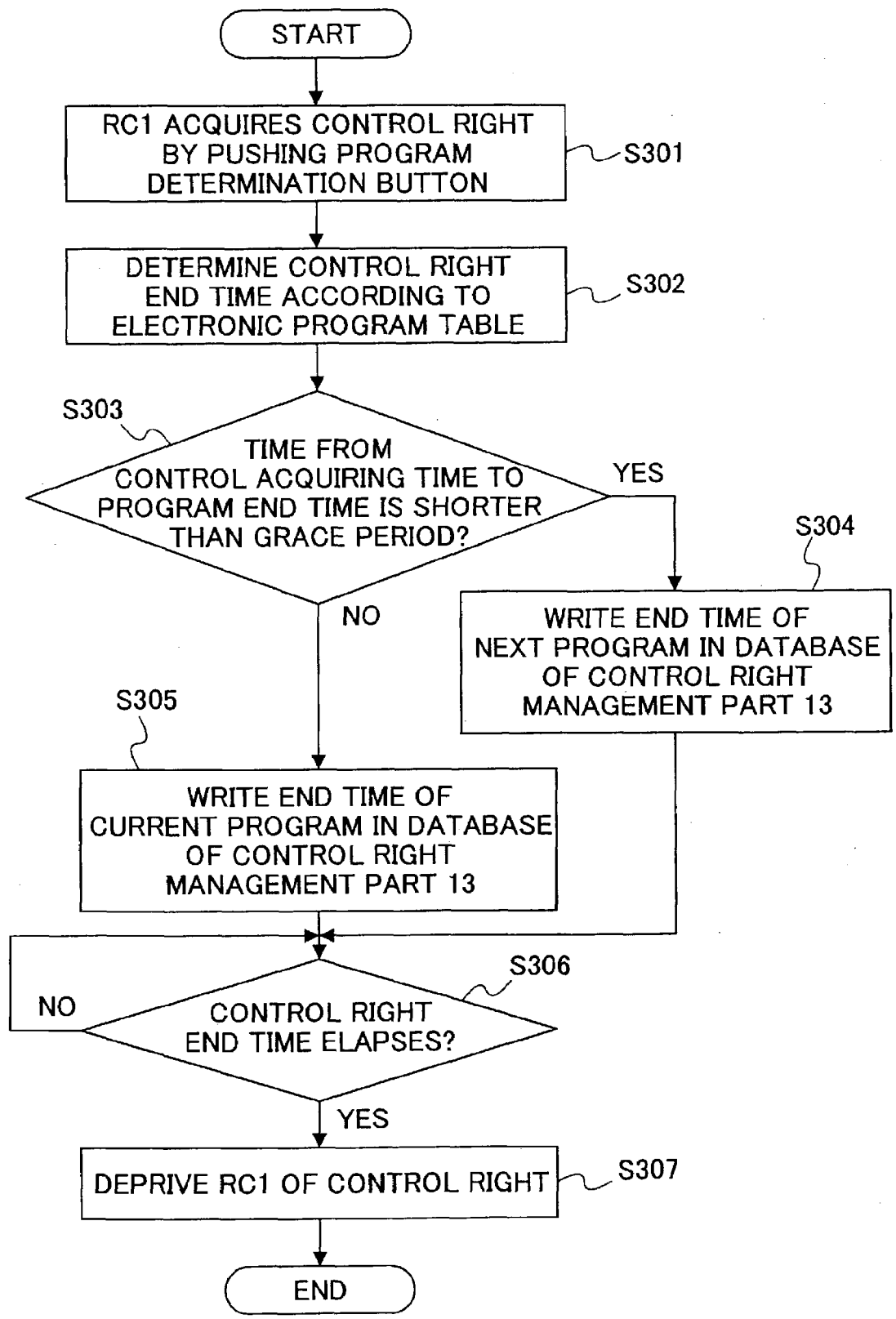
FIG. 17 shows a flowchart showing the operation of the third example of the second embodiment of the present invention.

FIG. 17 shows a flowchart showing the operation of the third example. The electric program table is stored in the program information management part 16 beforehand, and the grace period is set in the control right management part 13 beforehand.

First, the program determination button 3 of the first remote control unit RC1 is pushed, so that the first remote control unit RC1 acquires the control right for controlling the audio-visual display apparatus 20. The time when acquiring the control right is stored by the control right management part 13 in step S301.

Next, the control right end time is determined on the basis of the electronic program table in step S302. That is, the electronic program table stored in the program information management part 16 is displayed on the audio-visual output part 21. According to the displayed electronic program table, end time of the selected program is detected.

If the time from the control right acquiring time to the end time of the program is shorter than the grace period in step S303, a next program is searched, so that the database of the control right management part 13 is updated so as to use the end time of the next program as the control right end time by in step S304.

If the time from the control right acquiring time to the end time of the program is not shorter than the predetermined time in step S303, the database of the control right management part 13 is updated so as to use the end time of the currently broadcasted program as the control right end time by in step S305.

At the time of the end of the control right in step S306, the control right is deprived of from the first remote control unit RC1 in step S307.

That is, the control apparatus of the third example includes a receiving part for receiving a program specifying command for specifying a desired program and a remote control unit ID sent from a remote control unit; an end time detection part for detecting end time of a program specified by the program specifying time; a control right providing part for providing the control right to a remote control unit corresponding to the received ID until the detected end time elapses; a part for storing program specifying time; and a control right end time changing part for changing the end time of the provided control right to the end time of an end time of a next program if a time from the program specifying time to the end time of the program broadcasted when the program is specified is shorter than the grace period.

Fourth Example

In the following, the fourth example of the second embodiment will be described.

In the fourth example of the second embodiment, the control right is kept until the number of times of operations such as program change or program selection and the like exceeds a predetermined number from the time when the remote control unit acquires the control right. If the number of times exceeds the predetermined times, the control right is deprived of.

Figure 18:
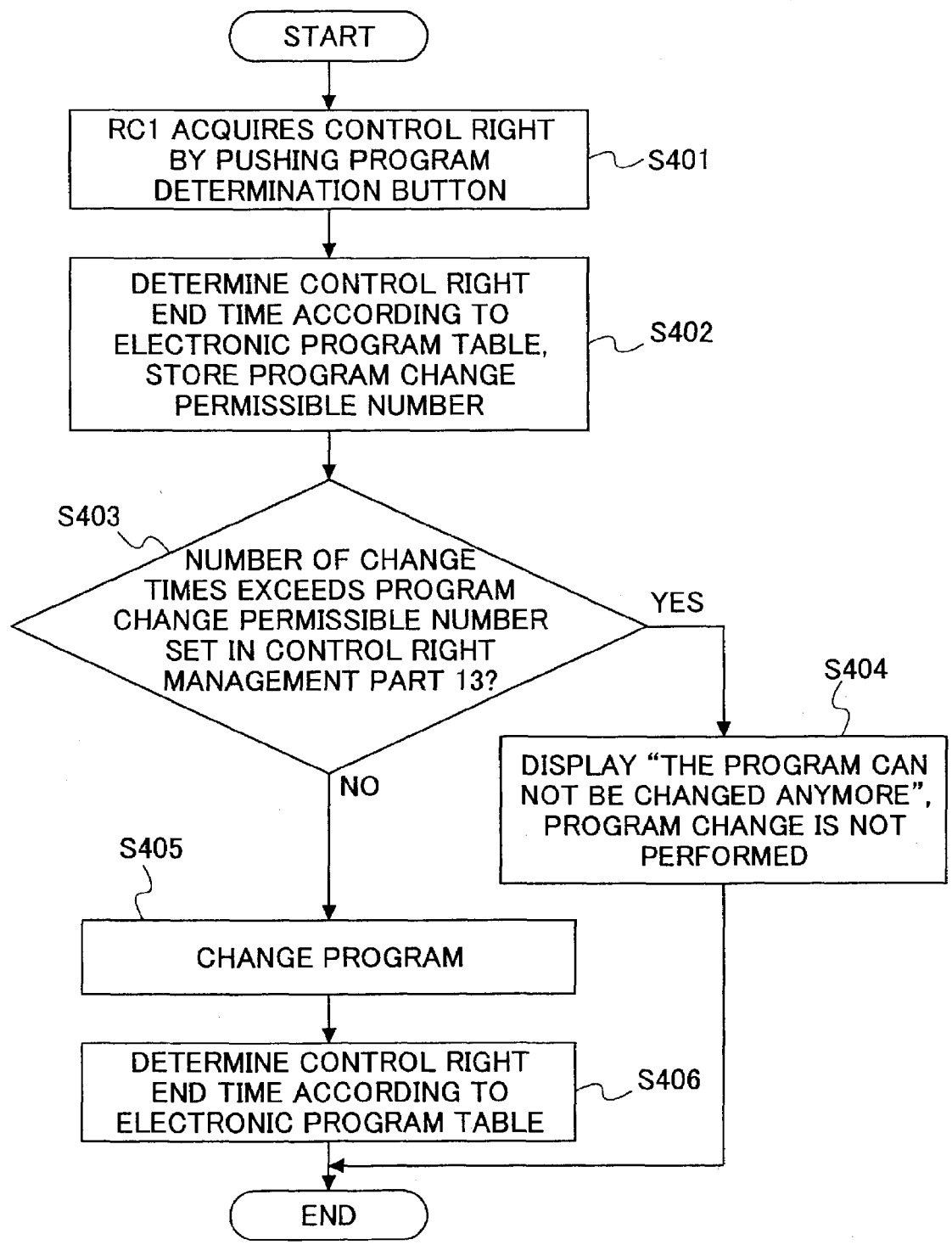
FIG. 18 shows a flowchart showing the operation of the fourth example of the second embodiment of the present invention.

FIG. 18 shows a flowchart showing the operation of the fourth example. It is assumed that the electronic program table is stored in the program information management part 16 beforehand, and the control right has been deprived of for every remote control unit before the step S401 is performed.

First, a program is selected by the first remote control unit RC1, and the program determination button 3 is pushed, so that the first remote control unit RC1 acquires the control right in step S401. When the control right is acquired, the variable of the number of times of program change is set to an initial value 0.

Next, the control right end time is determined according to the electronic program table, and a permissible number of program change is stored in step S402. The time when the selected program ends is a time when the control right ends.

When the program is changed, if the number of times of program change exceeds the permissible number set in the control right management part 13 in step S403, the audio-visual output part 21 displays "the program can not be changed anymore", and the program change is not performed in step S404.

If the number of times of program change does not exceed the permissible number set in the control right management part 13 in step S403, the program is changed to the selected program, and a control right end time is determined again according to the electronic program table in step S406.

That is, the control apparatus of the fourth example includes a permissible number setting part for permitting to change setting of the audio-visual display apparatus predetermined number of times; and a program change part for changing a program within the predetermined number of times; and a control right end time change part for changing end time of the control right at an end time of the changed program.

In addition, the control apparatus can be realized by executing a program on a computer. The program causes a computer to execute a receiving process for receiving a program specifying command for specifying a desired program in broadcasted programs and a remote control unit ID; a end time detection process for detecting the end time of the program specified by the program specifying program; and a control right providing process for providing the control right to a remote control unit corresponding to the received ID until the detected end time.

The program can be stored in a recording medium such as a FD (flexible disk), a CD (compact disk), a HD (hard disk), a DVD (digital versatile disk), a semiconductor memory and the like.

The second embodiment can be carried out in combination with the first embodiment. That is, the control apparatus of the first embodiment can be provided with a part for detecting end time of a program specified by an operation command, so that the control apparatus can be configured such that, when a remote control unit with the control right transmits an operation command for specifying a program, a control right can be deprived of from the remote control unit with control right at the end time of the program.

Although each of the embodiments is based on a radio wave broadcasting system, the embodiments can be also applied to Internet broadcasting and the like other than the radio wave broadcasting. In addition, information for controlling remote control units can be placed anywhere in each embodiment.

In each of the embodiments, the number of the remote control units can be two or more than three.

In radio wave broadcasting such as terrestrial television, one channel is assigned to one broadcast station, and, a desired program can be selected by selecting a channel. The program can be changed by changing the channel. As for the Internet broadcasting, URL corresponds to the channel. A program can be selected by specifying a URL. Although television channel is taken for an example in the above-mentioned embodiments to facilitate the understanding of the embodiments, the present invention is not limited to the radio wave broadcasting system such as the terrestrial television.

According to the embodiments, in a system in which an audio-visual display apparatus can be controlled by using a plurality of remote control units, the control right can be kept until a program ends, so that the user can watch and listen to the program without anxiety. In addition, by combining with the first embodiment, it can be avoided that the control right does not move to the other remote control unit as long as the remote control unit with the control right continues to request an operation.

The present invention is not limited to the specifically disclosed embodiments, and variations and modifications may be made without departing from the scope of the present invention.

What is claimed is:

1. A control apparatus of an audio-visual display apparatus, wherein a plurality of remote control units are associated with the audio-visual display apparatus, one remote control unit in the plurality of remote control units has a control right for controlling the audio-visual display apparatus, and other remote control units do not have the control right, the control apparatus comprising:

a receiving part for receiving an operation command and a remote control unit ID sent from a remote control unit;

a determining part for determining whether a signal is received from a remote control unit with the control right until a first predetermined time elapses, the first predetermined time is started from a time when detecting that an operation command is received from a remote control unit without the control right, the control right being transferred to the remote control unit without the control right if no signal is received from the remote control unit with the control right until the first predetermined time elapses;

a control right depriving and providing part for depriving the remote control unit with the control right of the control right and providing the control right to another remote control unit if a signal is not received from the remote control unit with the control right within the first predetermined time.

2. The control apparatus of the audio-visual display apparatus as claimed in claim 1, wherein the control right depriving and providing part:

rejects an operation command from the remote control unit without the control right if the remote control unit without the control right sends the operation command before a second predetermined time elapses, the second predetermined time is started from a time when the remote control unit with the control right sends an operation command, the second predetermined time being a time for assuring that the remote control unit with the control right continues to have the control right;

starts measurement of the first predetermined time if the remote control unit without the control right sends the operation command after the second predetermined time elapses.

3. The control apparatus of the audio-visual display apparatus as claim in claim 1, wherein the control apparatus displays information of an operation by the remote control unit without the control right on the audio-visual display apparatus if the control apparatus detects that the remote control unit without the control right sends the operation command.

4. The control apparatus of the audio-visual display apparatus as claimed in claim 1, the control apparatus comprising an end time detection part for detecting an end time of a program specified by the operation command;

wherein, when the remote control unit with the control right sends an operation command specifying a program, the control right depriving and providing part deprives the remote control unit with the control right of the control right at the end time of the program.

5. The control apparatus of the audio-visual display apparatus as claimed in claim 4, the control apparatus comprising a program information management part for storing and managing an electronic program table;

wherein the end time detection part detects the end time on the basis of the electronic program table.

6. The control apparatus of the audio-visual display apparatus as claimed in claim 4, the control apparatus comprising a program information management part for storing and managing a provisional program table in which a start time and an end time is provisionary determined for each program;

wherein the end time detection part detects the end time on the basis of the provisional program table.

7. The control apparatus of the audio-visual display apparatus as claimed in claim 4, the control apparatus comprising storing part for storing a program specifying time indicating a time when a program is specified;

wherein the control right depriving and providing part deprives the remote control unit with the control right of the control right at an end time of a next program instead of an end time of the specified program if a time from the program specifying time to the end time of the specified program is shorter than a third predetermined time.

8. The control apparatus of the audio-visual display apparatus as claimed in claim 4, the control apparatus comprising:

a permissible number setting part for permitting to change setting of the audio-visual display apparatus predetermined number of times; and a program change part for changing a program within the predetermined number of times;

wherein the control right depriving and providing part deprives the remote control unit with the control right of the control right at an end time of a program changed by the program change part.

9. A control method used in a control apparatus of an audio-visual display apparatus, wherein a plurality of remote control units are associated with the audio-visual display apparatus, one remote control unit in the plurality of remote control units has a control right for controlling the audio-visual display apparatus, and other remote control units do not have the control right, the control method comprising:

a receiving step for receiving an operation command and a remote control unit ID sent from a remote control unit;

a determining step for determining whether a signal is received from a remote control unit with the control right until a first predetermined time elapses, the first predetermined time is started from a time when detecting that an operation command is received from a remote control unit without the control right, the control right being transferred to the remote control unit without the control right if no signal is received from the remote control unit with the control right until the first predetermined time elapses;

a control right depriving and providing step for depriving the remote control unit with the control right of the control right and providing the control right to another remote control unit if a signal is not received from the remote control unit with the control right within the first predetermined time.

10. The control method as claimed in claim 9, wherein the control right depriving and providing step comprising steps of:
rejecting an operation command from the remote control unit without the control right if the remote control unit without the control right sends the operation command before a second predetermined time elapses, the second predetermined time is started from a time when the remote control unit with the control right sends an operation command, the second predetermined time being a time for assuring that the remote control unit with the control right continues to have the control right;
starting measurement of the first predetermined time if the remote control unit without the control right sends the operation command after the second predetermined time elapses.

11. The control method as claim in claim 9, wherein the control apparatus displays information of an operation by the remote control unit without the control right on the audio-visual display apparatus if the control apparatus detects that the remote control unit without the control right sends the operation command.

12. The control method as claimed in claim 9, the control method comprising an end time detection step for detecting an end time of a program specified by the operation command;
wherein, when the remote control unit with the control right sends an operation command specifying a program, the control right depriving and providing step includes a step of depriving the remote control unit with the control right of the control right at the end time of the program.

13. The control method as claimed in claim 12, the end time detection step includes a step of detecting the end time on the basis of an electronic program table.

14. The control method as claimed in claim 12, the control method including an end time detection step of detecting the end time on the basis of a provisional program table in which a start time and an end time is provisionary determined for each program.

15. The control method as claimed in claim 12, the control right depriving and providing step including a step of depriving the remote control unit with the control right of the control right at an end time of a next program instead of an end time of a specified program if a time from the program specifying time to the end time of the specified program is shorter than a third predetermined time.

16. The control method as claimed in claim 12, the control method comprising:
a permissible number setting step of permitting to change setting of the audio-visual display apparatus predetermined number of times; and
a program change step of changing a program within the predetermined number of times;
the control right depriving and providing including a step of depriving the remote control unit with the control right of the control right at an end time of a program changed in the program change step.

17. A computer program for causing a computer to control an audio-visual display apparatus and a plurality of remote control units, wherein the plurality of remote control units are associated with the audio-visual display apparatus, one remote control unit in the plurality of remote control units has a control right for controlling the audio-visual display apparatus, and other remote control units do not have the control right, the computer program comprising:
receiving program code means for receiving an operation command and a remote control unit ID sent from a remote control unit;
determining program code means for determining whether a signal is received from a remote control unit with the control right until a first predetermined time elapses, the first predetermined time is started from a time when detecting that an operation command is received from a remote control unit without the control right, the control right being transferred to the remote control unit without the control right if no signal is received from the remote control unit with the control right until the first predetermined time elapses;
control right depriving and providing program code means for depriving the remote control unit with the control right of the control right and providing the control right to another remote control unit if a signal is not received from the remote control unit with the control right within the first predetermined time.

18. The computer program as claimed in claim 17, wherein the control right depriving and providing program code means:
rejects an operation command from the remote control unit without the control right if the remote control unit without the control right sends the operation command before a second predetermined time elapses, the second predetermined time is started from a time when the remote control unit with the control right sends an operation command, the second predetermined time being a time for assuring that the remote control unit with the control right continues to have the control right;
starts measurement of the first predetermined time if the remote control unit without the control right sends the operation command after the second predetermined time elapses.

19. The computer program as claim in claim 18, the computer program including program code means for displaying information of an operation by the remote control unit without the control right on the audio-visual display apparatus if the computer detects that the remote control unit without the control right sends the operation command.

20. The computer program as claimed in claim 17, the computer program comprising an end time detection program code means for detecting an end time of a program specified by the operation command;
wherein, when the remote control unit with the control right sends an operation command specifying a program, the control right depriving and providing program code means deprives the remote control unit with the control right of the control right at the end time of the program.

21. The computer program as claimed in claim 20, the computer program comprising program information management program code means for storing and managing an electronic program table;
wherein the end time detection program code means detects the end time on the basis of the electronic program table.

22. The computer program as claimed in claim 20, the computer program comprising program information management program code means for storing and managing a provisional program table in which a start time and an end time is provisionary determined for each program;
wherein the end time detection program code means detects the end time on the basis of the provisional program table.

23. The computer program as claimed in claim 20, the computer program comprising storing program code means for storing a program specifying time indicating a time when a program is specified;
    wherein the control right depriving and providing program code means deprives the remote control unit with the control right of the control right at an end time of a next program instead of an end time of the specified program if a time from the program specifying time to the end time of the specified program is shorter than a third predetermined time.

24. The computer program as claimed in claim 20, the computer program comprising:
    permissible number setting program code means for permitting to change setting of the audio-visual display apparatus predetermined number of times; and
    program change program code means for changing a program within the predetermined number of times;
    wherein the control right depriving and providing program code means deprives the remote control unit with the control right of the control right at an end time of a program changed by the program change program code means.

25. A computer readable medium storing a computer program for causing a computer to control an audio-visual display apparatus and a plurality of remote control units, wherein the plurality of remote control units are associated with the audio-visual display apparatus, one remote control unit in the plurality of remote control units has a control right for controlling the audio-visual display apparatus, and other remote control units do not have the control right, the computer readable medium comprising:
    receiving program code means for receiving an operation command and a remote control unit ID sent from a remote control unit;
    determining program code means for determining whether a signal is received from a remote control unit with the control right until a first predetermined time elapses, the first predetermined time is started from a time when detecting that an operation command is received from a remote control unit without the control right, the control right being transferred to the remote control unit without the control right if no signal is received from the remote control unit with the control right until the first predetermined time elapses;
    control right depriving and providing program code means for depriving the remote control unit with the control right of the control right and providing the control right to another remote control unit if a signal is not received from the remote control unit with the control right within the first predetermined time.

26. The computer readable medium as claimed in claim 25, wherein the control right depriving and providing program code means:
    rejects an operation command from the remote control unit without the control right if the remote control unit without the control right sends the operation command before a second predetermined time elapses, the second predetermined time is started from a time when the remote control unit with the control right sends an operation command, the second predetermined time being a time for assuring that the remote control unit with the control right continues to have the control right;
    starts measurement of the first predetermined time if the remote control unit without the control right sends the operation command after the second predetermined time elapses.

27. The computer readable medium as claim in claim 26, the computer readable medium including program code means for displaying information of an operation by the remote control unit without the control right on the audio-visual display apparatus if the computer detects that the remote control unit without the control right sends the operation command.

28. The computer readable medium as claimed in claim 25, the computer readable medium comprising an end time detection program code means for detecting an end time of a program specified by the operation command;
    wherein, when the remote control unit with the control right sends an operation command specifying a program, the control right depriving and providing program code means deprives the remote control unit with the control right of the control right at the end time of the program.

29. The computer readable medium as claimed in claim 28, the computer readable medium comprising program information management program code means for storing and managing an electronic program table;
    wherein the end time detection program code means detects the end time on the basis of the electronic program table.

30. The computer readable medium as claimed in claim 28, the computer readable medium comprising program information management program code means for storing and managing a provisional program table in which a start time and an end time is provisionary determined for each program;
    wherein the end time detection program code means detects the end time on the basis of the provisional program table.

31. The computer readable medium as claimed in claim 28, the computer readable medium comprising storing program code means for storing a program specifying time indicating a time when a program is specified;
    wherein the control right depriving and providing program code means deprives the remote control unit with the control right of the control right at an end time of a next program instead of an end time of the specified program if a time from the program specifying time to the end time of the specified program is shorter than a third predetermined time.

32. The computer readable medium as claimed in claim 28, the computer readable medium comprising:
    permissible number setting program code means for permitting to change setting of the audio-visual display apparatus predetermined number of times; and
    program change program code means for changing a program within the predetermined number of times;
    wherein the control right depriving and providing program code means deprives the remote control unit with the control right of the control right at an end time of a program changed by the program change program code means.

* * * * *